United States Patent [19]

Power et al.

[11] Patent Number: 4,718,929
[45] Date of Patent: Jan. 12, 1988

[54] VAPOR PHASE METHOD FOR MAKING METAL HALIDE GLASSES

[75] Inventors: Joseph M. Power, Corning; Ahmad Sarhangi, Painted Post, both of N.Y.

[73] Assignee: Corning Glass Works, Corning, N.Y.

[21] Appl. No.: 544,129

[22] Filed: Oct. 21, 1983

[51] Int. Cl.⁴ .................... C03B 37/018; C03B 19/06
[52] U.S. Cl. .................... 65/3.12; 65/18.2; 65/DIG. 16; 423/489; 423/490; 423/499
[58] Field of Search ............ 65/3.12, DIG. 16, 18.2; 423/489, 490, 499

[56] References Cited

U.S. PATENT DOCUMENTS

| | | | |
|---|---|---|---|
| 3,356,527 | 12/1967 | Moshier et al. | 117/107.2 |
| 3,826,817 | 7/1974 | Pastor et al. | 423/499 |
| 3,933,302 | 1/1976 | Pastor et al. | 423/490 |
| 4,065,280 | 12/1977 | Kao et al. | 65/3 A |
| 4,076,574 | 2/1978 | Pastor et al. | 423/490 |
| 4,189,208 | 2/1980 | Grodkiewicz et al. | 350/96.34 |
| 4,262,035 | 4/1981 | Jaeger et al. | 427/39 |
| 4,292,063 | 9/1981 | Abe | 65/3.12 |
| 4,308,066 | 12/1981 | Mitachi et al. | 501/37 |
| 4,343,638 | 8/1982 | Mitachi et al. | 65/2 |
| 4,349,373 | 9/1982 | Sterling et al. | 65/60.8 |
| 4,378,987 | 4/1983 | Miller et al. | 65/3.12 |
| 4,501,602 | 2/1985 | Miller et al. | 65/18.2 |

FOREIGN PATENT DOCUMENTS 2444100 3/1976 Fed. Rep. of Germany .
57-051146 3/1982 Japan .

OTHER PUBLICATIONS

Pastor et al (I), *Mat. Res. Bull*, vol. 11 (#8), pp. 1037–1042 (Aug. 1976) Pergamon Press.
Belcher et al, *J. Inorg. Nucl. Chem.*, 31, 625–631 (1969) Pergamon Press.
Sievers et al, *Science*, 201 (#4352) pp. 217–223 (21 Jul. 1978).
K. S. Mazdiyasmi et al., "Yttrium and Lanthanide Tri-shexafluoroisopropoxide Diammoniates", *J Less Common Metals*, 30 (1973) pp. 105–112.

*Primary Examiner*—Edward A. Miller
*Attorney, Agent, or Firm*—K. van der Sterre

[57] ABSTRACT

A vapor phase method for making a metal halide material useful for the manufacture of an infrared transmitting optical waveguide fiber or other optical device, and the use of the method for making such a device, wherein a halogenated beta-diketonate of a metal to be incorporated in the device is converted to the corresponding metal halide by controlled decomposition of the halogenated diketonate, are described.

18 Claims, 3 Drawing Figures

VAPOR PHASE METHOD FOR MAKING METAL HALIDE GLASSES

The Government has rights in this invention pursuant to Contract No. N00014-82-C-2314 awarded by the Department of the Navy.

BACKGROUND OF THE INVENTION

The present invention relates to a method for making pure metal halides useful for manufacturing metal halide glasses or the like. More particularly, the invention relates to a method for making metal halide precursors by a vapor phase deposition process, and the use of those precursors to make glasses and glass articles such as optical waveguide preforms.

Metal halide compositions are presently of interest in connection with the development of new, transparent glassy materials exhibiting unique optical properties. For example, in the field of glass optical waveguides, which are transparent glass filaments used to transmit light signals for communication purposes, glasses of improved transparency are continually being sought.

Commercial glass optical waveguides are presently formed of oxide glass materials, typically fused silica and doped fused silica glasses. Improvements in such materials have continued to the point where loss coefficients near the theoretical minimum of 0.1 dB/km at 1.6 microns have been achieved. However, it has been recognized that even lower attenuations, perhaps as low as 0.001 dB/km, might be attainable in halide glass systems which can operate at wavelengths further into the infrared region. Among the halide glasses which have been considered for the manufacture of extremely low loss optical waveguide fibers are glasses based on $BeF_2$, $ZrF_4$ and $ZnCl_2$.

Examples of patents disclosing the use of metal halide glasses for infrared transmitting optical devices are U.S. Pats. Nos. 4,189,208, 4,308,066, and 4,343,638. These patents, however, teach preform or filament manufacture by conventional batch melting and forming methods.

Vapor deposition methods for making pure metal halides for metal halide glass optical devices have been proposed in U.S. Pat. No. 4,378,987 and in published Japanese Patent Application No. 57-051146. These methods offer the potential of providing the purity necessary for very low attenuation optical devices.

In the method of U.S. Pat. No. 4,378,987, a particulate metal halide precursor such as a metal fluoride powder is generated by reacting a vaporous metal source such as an organometallic compound (e.g., a metal alkyl or a metal beta-diketonate) with a vaporous halogen source such as HF. These reactive vapors are flowed into a reaction zone adjacent the substrate where they react to form the precursor, and this precursor is deposited on a substrate where it can be further processed by consolidation to form a transparent preform or fiber.

Although this method does avoid the inclusion of crucible impurities or the like in the glass, the handling of halogenating agents such as HF and HCl is difficult. HF, in particular, is corrosive and difficult to meter precisely, and if present in excess in the reaction mixture presents effluent handling difficulties. Also, due to the reactive nature of the starting materials used in this process, separate delivery systems for each of the reactants are required.

It is therefore a principal object of the present invention to provide a simplified process for making transparent metal fluoride-containing glasses by a vapor phase method, wherein the above described difficulties may be largely avoided.

Other objects and advantages of the invention will become apparent from the following description thereof.

SUMMARY OF THE INVENTION

The present invention avoids the need to employ halogenating agents such as HF, and thereby simplifies the vapor deposition process, by permitting the use of a single reagent rather than two reagents for each metal halide precursor or product to be provided. This single reagent is the source of both the metal and the halogen to be incorporated into the reaction product.

The reagents employed to provide halide deposits according to the invention are halogenated beta-diketonates of the metals of the desired metal halides. Beta-diketonates are known metal complexes consisting of a metal atom surrounded by ligands which are anions of beta-diketones. The latter are diketones of the general formula: R—CO—$CH_2$—CO—R, wherein R and R' are typically alkyl or substituted alkyl groups of 1-4 carbon atoms. These complexes are generally stable in air under ambient conditions and can exhibit good volatility.

In the present invention at least one of the R and R' groups of the ligand is a halogenated alkyl group which provides the halogen needed for metal halide formation. An example of such a ligand is the anion formed by removal of a hydrogen atom from the $C_3$ position of the beta-diketone 1,1,1,5,5,5-hexafluoro-2,4-pentanedione (hexafluoroacetylacetone), the diketone having the following structure:

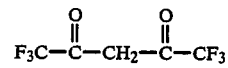

A metal halide precursor is produced according to the invention by providing a reactant stream which includes a vaporized halogenated beta-diketonate of a selected metal to be incorporated into the metal halide precursor deposit. This complex is decomposed in the reaction zone to form a vapor deposition product consisting essentially of the halide of the metal, which is collected as a particulate material or deposited as a particulate layer or integral film directly on a preform substrate. This metal halide product, which is throught to be formed from the beta-diketonate by intramolecular halogen transfer, will contain at most only trace amounts of impurities such as carbon or metal oxides. Any liquid and/or gaseous by-products of the decomposition reaction are separated from the metal halide product by volatilization, and are transported out of the reaction zone and away from the metal halide product. The resulting halide can then be further processed to form a desired glass preform or product, e.g., a glass optical waveguide filament.

BRIEF DESCRIPTION OF THE DRAWINGS

The drawings include schematic illustration of processing apparatus which may be used to provide a metal halide product in accordance with the invention, wherein.

DETAILED DESCRIPTION

Figure 1:
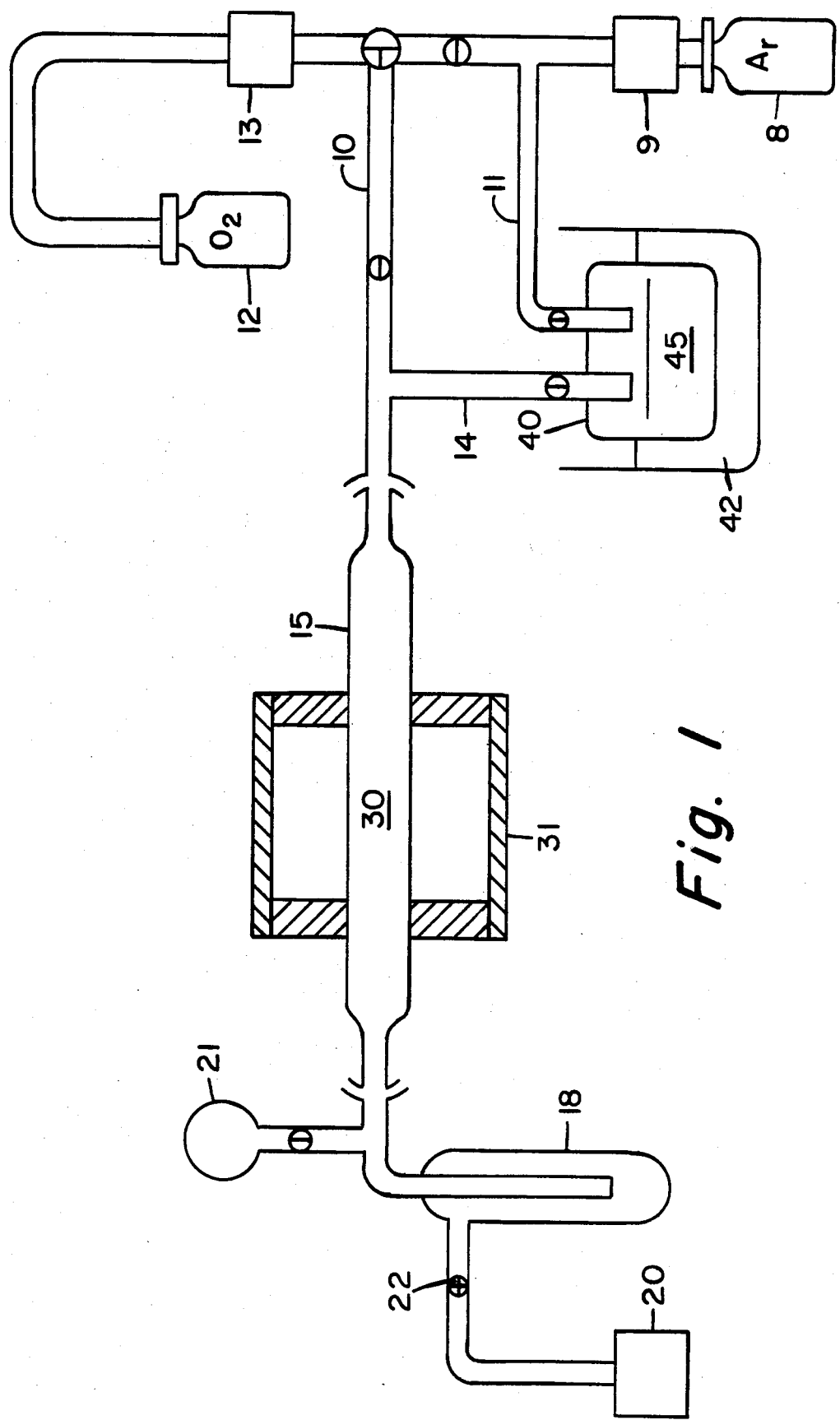
FIG. 1 schematically illustrates apparatus for producing metal halides by a thermal decomposition process.

It is believed that the process of the present invention may be useful to provide a variety of metal halide products, but the invention is particularly useful where it is desired to avoid the handling of corrosive fluorinating agents such as HF. The following discussion is therefore principally directed to the preparation of metal fluoride precursors, although the process may be adaptable to the preparation of metal chlorides or other halides as well.

Among the metals known to form beta-diketonate complexes of sufficient volatility to be vapor-transportable are Li, Na, Be, Mg, Si, Y, Cu, Hf, Ti, Zr, Zn, Pb, Cd, Al, Ga, Ce and some of the other rare earth metals. Most useful in the preparation of infrared transmitting halide materials are the chlorides and fluorides of these and other metals. Metal halide glasses are most easily formed in the relatively stable $BeF_2$-based composition system, but many other glass forming systems are known, and useful components of such systems include $ZnCl_2$, $ZnF_2$, $AlF_3$, $ZrF_4$, $HfF_4$, $MgF_2$, $PbF_2$, $CdF_2$, $ThF_4$ and the fluorides of some of the rare earth metals such as La, Ce, Yb and Lu. Some glassy metal bromides and/or iodides are also known.

Fluorinated beta-diketones which can be used to prepare the beta-diketonates of metals such as above described are known. Examples of some beta-diketones which can be used for metal halide production in accordance with the present invention are given in Table I below. Included in Table I are identifications of particular diketones as ligand compounds, a trivial name or symbol for each compound, and exemplary complexes wherein the ligands are identified by their corresponding symbols.

TABLE I

| Ligand Compound | Trivial Name (Symbol) | Exemplary Complexes |
|---|---|---|
| 1,1,1,5,5,5-hexafluoro-2,4-pentanedione | hexafluoroacetyl-acetone(Hhfa) | $Al(hfa)_3$ $Be(hfa)_2$ $Mg(hfa)_2$ $Zr(hfa)_4$ $Ti(hfa)_4$ $Zn(hfa)_2$ $Cd(hfa)_2$ |
| 6,6,7,7,8,8,8,-heptafluoro-2,2-dimethyl-3,5-octanedione | (Hfod) | $Ce(fod)_4$ $Hf(fod)_4$ |
| 1,1,1-trifluoro-2,4-pentanedione | trifluoroacetyl-acetone (Htfa) | $Ga(tfa)_3$ $Cu(tfa)_2$ $Sc(tfa)_3$ $Pb(tfa)_2$ |
| 1,1,1,5,5,6,6,7,7,7,-decafluoro-2,4-heptanedione | (Hdfhd) | $Mg(dfhd)_2$ |

The foregoing examples are illustrative only; other combinations among the metals and ligands shown, as well as combinations comprising other metals and other ligands, may alternatively be used.

It should be noted that Table I reports formulas for the complexes without any adducts being shown. In fact, the complexes may be available only as beta-diketonate adduct complexes, i.e., complexes wherein the metal beta-diketonate is further complexed with a Lewis Base (L), wherein L can be, for example, ether, dioxine, tetrahydrofuron, $H_2O$, $NH_3$, pyridine and dimethyl formamide. Many of these adducts are sufficiently volatile for use, and some are sufficiently volatile and stable to be preferred.

The transport of the beta-diketonate reactant into the reaction zone is preferably by means of an inert carrier gas, i.e., argon, nitrogen or the like, in order to avoid oxidation or other side reaction which might involve the metallic or halogen components of the complex. Because of the desirability of carrying out the decomposition reaction in a controlled environment, a preferred practice is to utilize a hollow tubular substrate as the deposition substrate for the precursor, and to carry out the decomposition reaction inside of this tube. In this way the tube acts both as a substrate for the collection of the precursor, which deposits as particulate matter or as a smooth film on the inner surface of the tube wall, and also as a closed environment from which moisture, oxygen, and undesirable contaminants can be excluded.

Where it is desired to deposit the metal halide precursor on the external surface of a solid preform or to collect the product for later processing outside the reaction zone, a protective enclosure may be provided to control the environment of the reaction zone. This enclosure can function as a controlled pressure chamber in cases where the decomposition reaction is to be carried out under pressure conditions other than ambient.

It is, of course, possible to utilize halogen sources in addition to the beta-diketonate source compounds in providing metal halide deposits in accordance with the invention, and this may even be desirable where, for example, the doping of a metal halide deposit with excess halogens is to be used to modify the optical or other properties of the metal halide product. However, the principal source of metal and halogen for the metal halide to be deposited according to the invention is the decomposing halogenated beta-diketonate source complex.

The intramolecular fluorine transfer reaction through which metal fluorides are formed from beta-diketonate complexes requires that energy be supplied to the complex at the reaction site to generate the metal halide product. The source of energy for the reaction is not critical, and can be an electric furnace, a flame, a laser, or other thermal heating device. Other suitable energizing means include plasmas, e.g. plasma discharges at radio frequencies or microwave frequencies.

Generally, energizing techniques which provide uniform thermal conditions throughout the reaction zone, and which minimize heating of the reactants beyond that necessary to initiate the decomposition reaction, are preferred. Hot spots in the reaction zone can cause carbonization of decomposition by-products and result in carbon deposits in the metal halide product.

The processing of particulate precursor resulting from the decomposition reaction can be carried out in the known manner to provide an optical waveguide fiber or other infrared transmitting optical device. The consolidation of such a precursor to clear glass can, in the case of stable glass forming compositions, be carried out by simply heating the precursor to consolidation temperatures, and this can be done concurrently with particulate deposition, if desired. In other cases the particulate deposit can be consolidated after deposition, under conditions which have been optimized for glass formation rather than precursor formation. Where the precursor is deposited as a smooth film, consolidation steps are not generally required.

Fluoride glass products produced in accordance with procedures such as above described are essentially free of oxygen and metal oxides, notwithstanding the presence of metal-oxygen coordination bonds in the beta-diketonate starting materials. The most likely contaminant of the product is carbon, but the presence of this impurity can be minimized by avoiding excessive temperatures in the reaction zone which may carbonize organic substituents of the organometallic molecules. Alternatively, the use of a carbon getter such as $O_2$, $F_2$, $CF_4$ or the like, as described in the copending commonly assigned application of A. Sarhangi, Ser. No. 544,130, concurrently filed herewith, can help to avoid carbon in the product.

The invention may be further understood by reference to the following Examples illustrating the preparation of a metal halide by vapor deposition in accordance herewith.

EXAMPLE 1

A pure metal halide, $AlF_3$, is produced by thermally decomposing an aluminum beta-diketonate, $Al(hfa)_3$ (aluminum hexafluoroacetylacetonate), which is present in a carrier gas stream passed through a heated reaction zone. Apparatus suitable for carrying out this procedure is schematically illustrated in FIG. 1 of the drawing.

Referring to FIG. 1, a carrier gas such as argon from source 8 can be supplied for the reaction through either of glass delivery tubes 10 or 11, after metering through mass flow controller 9. Optional gas source 12 is also provided, with flowmeter 13, for procedures where a getter gas (e.g. oxygen as shown), is to be used.

The argon carrier gas can be transported into the system using either of glass delivery lines 11 or 12. If line 11 is used, the argon carrier is passed into vaporization chamber 40 which can be heated by means of oil bath 42. Argon introduced into chamber 40 picks up vapors of a heated organometallic compound 45, such as $Al(hfa)_3$, and transports them via glass delivery line 14 to glass reaction tube 15. Delivery line 14 is optionally provided with heating means such as an electrical heating tape for use where compound 45 tends to condense in the line.

Organometallic vapors passing into tube 15 are conveyed through reaction zone 30, which is that section of the tube 15 within the hot zone of electrically heated furnace 31. The vertical walls of furnace 31 can be horizontally moved to adjust the length of the reaction zone.

Metal halides produced by intramolecular halogen transfer during organometallic compound decomposition in the furnace are non-volatile and are deposited on the walls of the tube 15 within or beyond reaction zone 30. Volatile by-products of the decomposition are transported out of the reaction zone and may be condensed in optional trap 18 or removed by scrubbing. A porous plug may be provided at the outlet and at reaction zone 30 to trap any metal halide being transported by the vapor stream, if desired. Pressure in the reaction zone is monitored by gauge 21, and can be controlled by needle valve 22.

In the operation of this apparatus to produce pure $AlF_3$ for use, for example in the preparation of an infrared-transmitting halide glass, a quantity of pure $Al(hfa)_3$, a white crystalline compound melting at 73°C., is provided in the vaporization chamber and heated to about 80° C. The furnace is then heated to 500° C. and delivery line 14 to 120° C., while argon at a flow rate of about 400 cc/min. is passed through reaction tube 15 via delivery line 10. System pressure is maintained at about 100 mm (Hg) by vacuum source 20 and needle valve 22.

The reaction tube is formed of Corning Code 7740 glass, a heat resistant borosilicate glass having a thermal expansion coefficient of about $33 \times 10^{-7}$/°C. and good chemical durability. The tube has an inside diameter of about 22 mm, and the length of tube in the hot zone of the furnace is about 12 inches.

After the described conditions have been established, argon flow is diverted from tube 10 into tube 11 and through chamber 40 where $Al(hfa)_3$ vapors are picked up and transported through tube 14 and into reaction tube 15 and zone 30. As the thermal decomposition of the $Al(hfa)_3$ commences in the reaction zone, a grey-black powder is formed on the wall of the reaction tube and a yellow liquid is collected in the cold trap. After a run of 1-2 hours, system operation is stopped and the solid reaction product on the reaction tube wall is collected for analysis.

The grey-black powder is examined by X-ray diffraction and chemical analysis, and is identified as $AlF_3$. A trace of carbon (0.2% by weight) is present. Thus the decomposition of $Al(hfa)_3$ under the described conditions yields $AlF_3$, rather than a mixture of $AlF_3$ and $Al_2O_3$. The trapped yellow liquid byproduct is identified as 2,2-difluoro-2,3-dihydro-5-trifluoromethylfuran-3-one, having the following structure:

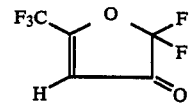

EXAMPLE 2

In an alternative procedure, the steps of Example 1 are repeated except that a getter gas for carbon, consisting essentially of pure oxygen, is introduced into the reaction zone during the decomposition reaction. Referring to FIG. 1 of the drawing, this oxygen is provided by oxygen source 12 and is metered by flowmeter 13 which includes a valve for controlling the flow of oxygen into the reaction tube.

The vapor stream introduced into reaction tube 15 includes a carrier gas comprising 50% $O_2$ and 50% Ar by volume, this mixture passing through the reaction tube at a rate of 40 cc/min. The reaction tube is 31 mm in diameter and the reaction zone is 6 inches in length. System pressure is maintained at 200 mm(Hg) during the run.

With the furnace operating at 500° C., the argon fraction of the carrier stream is diverted from line 10 to line 11 and through vaporization chamber 40 which is maintained at 80° C. Heated $Al(hfa)_3$ vapors are picked up by the argon and transported into the reaction zone with the oxygen getter gas from source 12.

Under the described conditions a white deposit is formed on the walls of tube 15 in the reaction zone. After a run of one hour, the argon is rediverted from tube 11 (and the vapor generator) to tube 10 and, after flushing the reaction tube with the argon-oxygen carrier mixture, the gas flows are shut off and reaction tube 15 removed from the system. Analysis of the deposited product identifies it as $AlF_3$ which is essentially free of co-deposited carbon.

As previously noted, the reactions giving rise to the formation of metal fluorides from fluorinated beta-diketonates can be promoted by a variety of methods including, in addition to the direct heating method above described, techniques such as laser heating and energization by means of plasmas or ultraviolet radiation. A technique holding particular promise as a way to minimize excessive thermal heating of the reaction zone is that of non-isothermal plasma vapor deposition; e.g., deposition using a low-pressure radio-frequency or microwave plasma. These techniques are of particular interest for the deposition of very soft (low-melting) glasses, which may be fluid at the temperatures needed for thermal decomposition. The following Example illustrates such a technique.

EXAMPLE 3

A vapor delivery and reaction system similar to that described in Example I above is used to provide an AlF$_3$ reaction product from an Al(hfa)$_3$ starting material as therein described, except that the furnace at the reaction zone is replaced by a microwave plasma generator for driving the vapor deposition reaction. The microwave plasma generator comprises a cylindrical resonant microwave cavity surrounding the reaction tube, which cavity is connected to a variable power 2.45 Ghz microwave generator.

Figure 2:
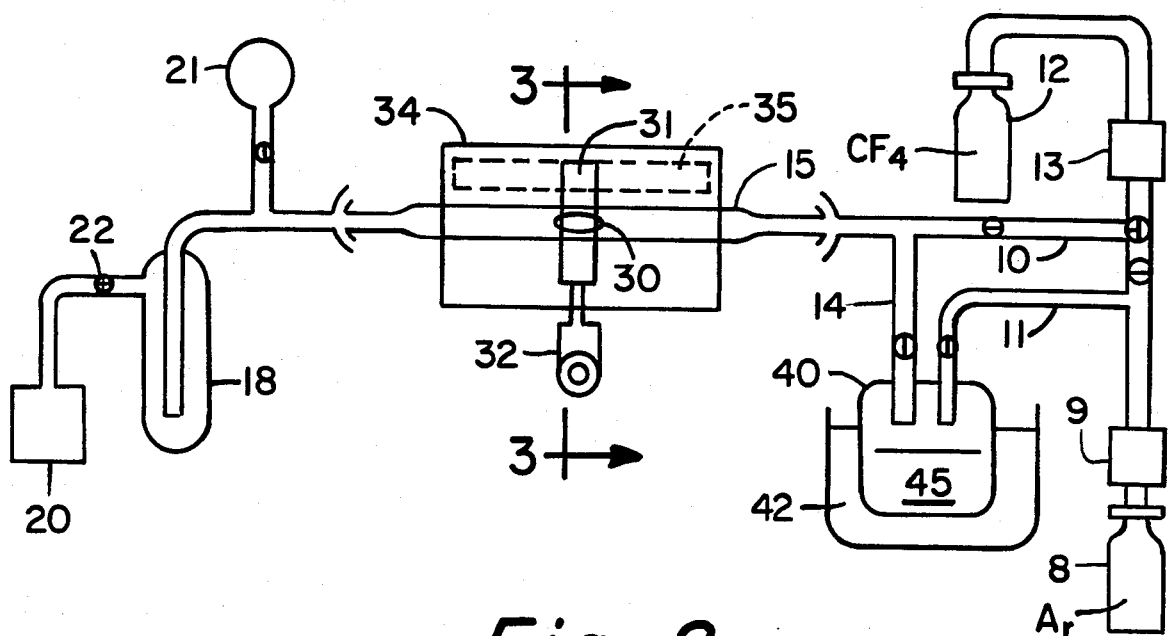
FIGS. 2 and 3 schematically illustrate apparatus for producing metal halides by a plasma reaction process.
Figure 3:
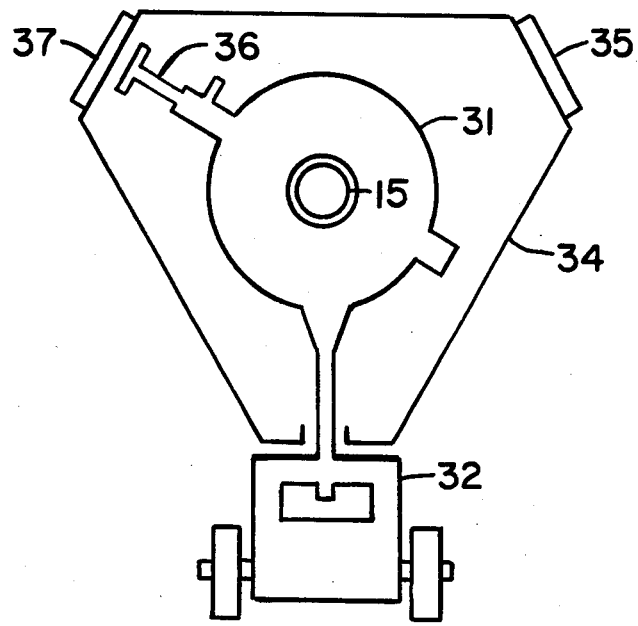

A vapor delivery and reaction system of this type, incorporating a microwave cavity at the reaction site to carry out the decomposition reaction, is shown in FIGS. 2 and 3 of the drawing. Referring to FIG. 2, a carrier gas such as argon is supplied from source 8, with flow control by mass flow controller 9, and can be passed into either of glass delivery tubes 10 or 11. An optional gas source 12, containing a carbon getter gas such as CF$_4$, is provided together with flowmeter 13 for metering this gas. A vapor generator system 40, 42, 45 is provided as in FIG. 1, and system pressure is controlled by vacuum source 20 and needle value 22, with pressure measurement by gauge 21. In this system, however, as the organometallic vapors are transported into reaction tube 15 they enter microwave discharge 30 which is maintained within the reaction tube by microwave cavity 31. Microwave power is supplied to cavity 31 by a conventional microwave generator, not shown, connected to the cavity by a coaxial cable.

Microwave cavity 31 is positioned on carriage assembly 32 which moves the cavity reciprocally along reaction tube 15, so that the microwave discharge 30 traverses the length of the interior of the tube. The reaction tube 15 and microwave cavity 31 are contained within heated enclosure 34 which includes a viewport 35, shown in phantom. The enclosure is maintained at a temperature sufficient to prevent condensation of unreacted starting materials on the inner wall of the reaction tube.

Referring to FIG. 3 of the drawing, which is a schematic cross-sectional view of the apparatus of FIG. 2 along line 3—3, enclosure 34 contains cavity 31 which is supported on carriage assembly 32. Cavity 31 includes conventional tuning means 36, which is used to adjust cavity characteristics to obtain the efficient coupling of microwave energy into the plasma. Chamber 34 includes access door 37 through which adjustment of the tuning means can be carried out.

In the operation of the apparatus shown, vaporization chamber 40 (FIG. 2) containing a quantity of solid Al(hfa)$_3$ 45 is heated to a temperature of approximately 40° C. by means of oil bath 42. Meanwhile, argon flow from tank 8 is commenced through delivery line 10 directly into the reaction zone within tube 15. The initial flow through tube 10 is at a rate of about 20 cc/min. of argon, with system pressure being maintained at about 1 mm (Hg) by vacuum source 20 and needle valve 22, as measured by gauge 21. A microwave discharge 30 is then initiated within the reaction tube segment surrounded by microwave cavity 31, and the discharge is stabilized at an input power level of about 100 watts.

After the discharge has stabilized, the argon flow from tank 8 is gradually diverted from delivery line 10 into delivery line 11 and through chamber 40 where it passes over the surface of the heated Al(hfa)$_3$. Vaporized Al(hfa)$_3$ picked up by the argon is then transported through heated delivery line 14 and into reaction tube 15. At the same time, 10 cc/min. of CF$_4$, a carbon getter gas, is supplied to the reaction tube from tank 12 via delivery line 10. Heated delivery line 14 and enclosure 34 are maintained at about 120° C. to prevent the condensation of Al(hfa)$_3$ prior to its passage into the reaction zone.

As the Al(hfa)$_3$ reactant passes through the microwave discharge reaction zone 30 in the reaction tube, it is decomposed to yield solid and gaseous products. The gaseous products, which are byproducts of the decomposition of Al(hfa)$_3$, are transported out of the reaction zone and exhausted from the system. The solid product, in the form of a white powder, is retained and deposited on the walls of the reaction tube 15, and is subsequently identified by chemical and X-ray analysis as AlF$_3$. Optional trap 18 may be provided to condense byproducts and any unreacted materials present in the exhaust, if desired.

Analysis of the AlF$_3$ produced by this plasma deposition shows a carbon contamination level of about 0.03% weight percent. This low carbon content is partly attributed to the relatively uniform and controlled thermal conditions existing in the plasma reaction zone. Further reductions in carbon content could be achieved by using other getter gases, such as O$_2$ or F$_2$, alone or in combination with CF$_4$ or each other, if desired.

Metal halide compositions which are candidates for the production of glasses by the controlled decomposition of halogenated beta-diketonate complexes according to the invention are illustrated in Table II below. Included in Table II are illustrative candidate compositions known to form metal halide glasses, and metal beta-diketonate compounds exhibiting sufficient volatility to be considered attractive source compounds for the preparation of vapor-deposited glasses from the illustrative compositions.

TABLE II

| Composition No. | Candidate Glass Composition (Mole %) | Source Compounds |
|---|---|---|
| 1 | 100% BeF$_2$ | Be(hfa)$_2$ |
| 2 | 92.5% BeF$_2$, 7.5% AlF$_3$ | Be(hfa)$_2$, Al(hfa)$_3$ |
| 3 | 70% PbF$_2$, 30% AlF$_3$ | Pb(tfa)$_2$, Al(hfa)$_3$ |

To make an optical waveguide preform following the method of the invention using, for example, representative compositions from Table II above, source compounds or mixtures of source compounds in a suitable carrier gas can be decomposed in a reaction tube, which is a bait tube for the preform, to form layers of halide glass on the inner wall of the tube which will ultimately form the core and cladding layers of the optical waveguide. Apparatus which could be employed to make the preform includes, for example, the apparatus designed for metal halide preform fabrication disclosed in U.S. Pat. No. 4,378,987, expressly incorporated herein by reference. That apparatus includes multiple vapor generators, means for rotating the reaction tube in a heated environment, and a provision for relative movement between the tube and a heat source for sintering the metal halide deposits to glass. However, since no fluorinating agents such as HF need be used, the apparatus of the patent can be simplified in that only a simple feed tube or other input line need by employed to convey the vapors into the bait tube. A theoretical example of the manufacture of a waveguide preform in accordance with the invention is as follows.

EXAMPLE 4

A reaction tube composed of Corning Code 7073 glass is selected for use as the preform bait tube. The glass making up the tube is a borosilicate glass having a thermal expansion coefficient of about $53 \times 10^{-7}/°C$.

To form a glass cladding layer on the interior wall of this tube an argon carrier gas stream containing vapors of $Be(hfa)_2$ (beryllium hexafluorocacetylacetonate), a white crystalline organometallic compound melting at 70° C., is passed through the tube. The $Ba(hfa)_2$ vapors are produced by a vapor generator such as shown in FIGS. 1 or 2 of the drawings. If necessary, a carbon getter such as oxygen, fluorine, $CF_4$ and oxygen, or the like, could be included in the vapor stream to minimize carbon deposition.

During this period of vapor flow the tube is axially rotated and also translated past an energy source such as a furnace or flame to convert the $Be(hfa)_2$ present in the vapor stream to $BeF_2$. If thermal heating is used, a temperature of approximately 500° C. in the bait tube is sufficient to cause $Be(hfa)_2$ decomposition and to sinter $BeF_2$ formed and deposited by the decomposition to a glassy layer on the tube wall. During this $BeF_2$ laydown step, the minimum temperature in the vicinity of the tube wall is maintained sufficiently high, e.g. 120° C., to prevent the condensation of unreacted $Be(hfa)_2$ on the tube wall.

After a layer of sintered $BeF_2$ sufficiently thick to form a waveguide cladding layer has been deposited on the tube wall, the composition of the vapor stream is modified by the addition of $Al(hfa)_3$ vapors to the $Be(hfa)_2$ vapors and carrier gas, the $Al(hfa)_3$ vapors originating from a separate vapor generator of a type such as shown in FIGS. 1 or 2. The ratio of $Be(hfa)_2$:$Al(hfa)_3$ in the vapor stream is about 12.33:1, providing a $BeF_2$-$AlF_3$ soot mixture containing about 92.5 mole percent $BeF_2$ and 7.5 mole percent $AlF_3$ which sinters as it is deposited over the $BeF_2$ layer on the tube wall.

After a sufficiently thick layer of $AlF_3$-$BeF_2$ has been deposited on the tube wall to form a waveguide core element, vapor flow is terminated and the tube is heated above about 710° C. to collapse it into a solid rod. In cross-section this rod, which is the waveguide preform, comprises a solid core member consisting of $AlF_3$-$BeF_2$ glass containing about 7.5 mole percent $AlF_3$ and having a refractive index ($n_d$) of about 1.31, a cladding layer of $BeF_2$ glass having a refractive index ($n_d$) of about 1.28, and an outer layer of borosilicate glass having a refractive index on the order of about 1.5. When drawn into glass fiber, an optical waveguide having a stepped refractive index profile and a numerical aperture of about 0.28 would be provided from this preform.

In addition to the manufacture of glass preforms for the production of infrared transmitting optical waveguide fibers, the invention can also be used to make other metal halide products for optical or other applications. The products can range from amorphous, extremely transparent metal halide glasses to pure but opaque, polycrystalline metal fluoride compositions which are free of undesirable metal contaminants and therefor suitable for a variety of other technical applications. These products are readily obtainable via the controlled vapor phase decomposition of halogenated beta-diketonates as above described, producing oxygen-free metal halide products without the need for employing HF or other additional halogen sources of the kind employed in the prior art.

We claim:

1. A method for making a metal halide product which comprises the steps of:
   (a) introducing into a reaction zone a reactant vapor stream which comprises vapors of a halogenated metal beta-diketonate containing the metal and the halogen to be incorporated into the metal halide product; and
   (b) supplying energy to the reactant vapor stream at a rate sufficient to cause the decomposition of the metal beta-diketonate and the formation of a vapor deposition product therefrom which consists essentially of the metal halide of the metal and the halogen, the metal beta-diketonate being the principal source of both metal and halogen in the metal halide.

2. A method in accordance with claim 1 wherein the metal halide product includes at least one metal selected from the group consisting of Be, MG, Pb, Zn, Al, Zr, Hf, and Ce, and wherein the halogens are selected from the group consisting of Cl and F.

3. A method in accordance with claim 2 wherein the beta-diketonate is a fluorinated beta-diketonate and the metal halide product is a metal fluoride 4. A method in accordance with claim 3 wherein the energy is supplied by thermal heating of the reactant vapor stream.

5. A method in accordance with claim 3 wherein the energy is supplied to the reactant vapor stream by a low-pressure plasma discharge.

6. In a method for forming a metal halide optical fiber preform comprising the steps of providing a substrate, flowing reactive vapors into a reaction zone adjacent the substrate, and reacting the vapors to form a metal halide precursor material which is deposited onto the substrate, the improvement characterized in that the reactive vapors comprise a halogenated beta-diketonate containing the halogen and the metal to be incorporated as a metal halide in the precursor, and in that the halogenated beta-diketonate constitutes the principal source of both metal and halogen in the metal halide.

7. A method in accordance with claim 6 wherein the metal halide includes at least one metal selected from the group consisting of Be, Mg, Pb, Zn, Al, Zr, Hf and Ce, and wherein the halogens are selected from the group consisting of Cl and F.

8. A method in accordance with claim 7 wherein the beta-diketonate is a fluorinated beta-diketonate and the metal halide is a metal fluoride.

9. A method in accordance with claim 8 wherein the precursor consists of 85-100 mole percent $BeF_2$ and 0-15 mole percent $AlF_3$.

10. A method in accordance with claim 6 wherein the halogenated beta-diketonate incorporates beta-diketone ligands which contain 5-12 carbon atoms.

11. A method in accordance with claim 10 wherein the beta-diketone ligand is derived from hexafluoroacetylacetone.

12. A method in accordance with claim 8 wherein decomposition of the fluorinated beta-diketonate is promoted by thermal heating of the reaction zone.

13. A method in accordance with claim 8 wherein decomposition of the fluorinated beta-diketonate is promoted by a low-pressure plasma discharge.

14. A method in accordance with claim 13 wherein the low-pressure plasma discharge is a microwave or radio frequency discharge.

15. In a method for forming a metal halide optical fiber preform comprising the steps of providing a hollow tubular substrate, flowing reactive vapors into a reaction zone within the tubular substrate, and reacting the vapors to form a metal halide precursor material which is deposited onto the inner surface of the substrate, the improvement characterized in that the reactive vapors comprise a halogenated beta-diketonate containing the halogen and the metal to be incorporated as a metal halide into the precursor, and in that the halogenated beta-diketonate constitutes the principal source of both metal and halogen in the metal halide.

16. A method for making a product consisting essentially of a substantially oxygen-free vapor deposited metal halide which comprises the step of decomposing a vaporized fluorinated beta-diketonate of the metal to form the corresponding metal fluoride by intramolecular fluorine transfer, such that the fluorinated beta-diketonate constitutes the principal source of metal and halogen in the metal halide product.

17. A method for making a substantially oxygen-free vapor deposited metal halide which comprises the step of decomposing a fluorinated beta-diketonate of the metal to form the corresponding metal fluoride by intramolecular fluorine transfer wherein the decomposition is promoted by thermal heating of the beta-diketonate at a temperature sufficient for metal fluoride formation but below the temperature at which significant carbonization of the beta-diketonate will occur, such that the fluorinated beta-diketonate constitutes the principal source of metal and halogen in the metal halide product.

18. A method in accordance with claim 16 wherein the decomposition is promoted by a low-pressure plasma discharge.

* * * * *

UNITED STATES PATENT AND TRADEMARK OFFICE
CERTIFICATE OF CORRECTION

PATENT NO. : 4,718,929

DATED : January 12, 1988

INVENTOR(S) : Joseph M. Power et al.

It is certified that error appears in the above-identified patent and that said Letters Patent is hereby corrected as shown below:

Column 9, line 12, change "by" to --be--.

Column 10 (claim 2), line 34, change "MG" to --Mg--.

Column 12 (claim 16), line 6, place a comma after "vaporized".

Column 12 (claim 16), line 10, delete "product".

Column 12 (claim 17), line 12, place a hyphen between "vapor" and "deposited".

Signed and Sealed this

Seventeenth Day of January, 1989

Attest:

DONALD J. QUIGG

*Attesting Officer*  *Commissioner of Patents and Trademarks*